United States Patent
Risch et al.

(10) Patent No.: US 10,185,105 B2
(45) Date of Patent: Jan. 22, 2019

(54) FLEXIBLE OPTICAL-FIBER RIBBON

(71) Applicant: Prysmian S.p.A., Milan (IT)

(72) Inventors: Brian G. Risch, Granite Falls, NC (US); Erin Jean Bowman, Hickory, NC (US)

(73) Assignee: Prysmian S.p.A., Milan (IT)

( * ) Notice: Subject to any disclaimer, the term of this patent is extended or adjusted under 35 U.S.C. 154(b) by 31 days.

(21) Appl. No.: 15/658,644

(22) Filed: Jul. 25, 2017

(65) Prior Publication Data
US 2018/0031792 A1 Feb. 1, 2018

(51) Int. Cl.
*G02B 6/44* (2006.01)

(52) U.S. Cl.
CPC ......... *G02B 6/4404* (2013.01); *G02B 6/4403* (2013.01); *G02B 6/448* (2013.01)

(58) Field of Classification Search
CPC .... G02B 6/4404; G02B 6/443; G02B 6/4434; G02B 6/448; G02B 6/4403
USPC .................................. 385/100, 114, 123–128
See application file for complete search history.

(56) References Cited

U.S. PATENT DOCUMENTS

| | | | |
|---|---|---|---|
| 4,877,306 A * | 10/1989 | Kar | G02B 6/03611 385/128 |
| 5,682,454 A | 10/1997 | Gaillard | |
| 5,720,908 A | 2/1998 | Gaillard | |
| 5,763,003 A | 6/1998 | Bonicel et al. | |
| 7,209,022 B2 * | 4/2007 | Kuroiwa | H01F 17/045 336/200 |
| 8,145,027 B2 | 3/2012 | Overton et al. | |
| 8,265,442 B2 | 9/2012 | Overton | |
| 8,385,705 B2 | 2/2013 | Overton et al. | |
| 9,086,555 B2 | 7/2015 | Namazue et al. | |
| 9,341,771 B2 | 5/2016 | Molin et al. | |
| 2003/0118301 A1 | 6/2003 | Hurley et al. | |
| 2004/0022510 A1 * | 2/2004 | Suzuki | C03C 25/1065 385/128 |
| 2008/0056653 A1 | 3/2008 | Sato et al. | |
| 2009/0093622 A1 | 4/2009 | Ruelle | |
| 2011/0110635 A1 | 5/2011 | Toge et al. | |
| 2013/0156390 A1 | 6/2013 | Matsuzawa et al. | |
| 2014/0112631 A1 | 4/2014 | Namazue et al. | |
| 2017/0031121 A1 * | 2/2017 | Blazer | G02B 6/4404 |
| 2017/0090135 A1 * | 3/2017 | Sato | G02B 6/4403 |

FOREIGN PATENT DOCUMENTS

| | | |
|---|---|---|
| EP | 0097414 A1 | 1/1984 |
| FR | 2693560 A1 | 1/1994 |
| JP | 06-186461 A | 7/1994 |

(Continued)

OTHER PUBLICATIONS

International Search Report and Written Opinion in counterpart International Application No. PCT/US2016/044182 dated Apr. 5, 2017, pp. 1-20.
DSM DesoTech, Product Data for Cablelite 3287-9-41, www.dsmdesotech.com, Elgin, IL, pp. 1-4 (no date).
GE Bayer, Product Sheet for RTV6100 Series Silicone Dielectric Gels, http://www.korsil.ru/content/files/catalog1/rtv_6156.pdf, pp. 1-4 (no date).

(Continued)

*Primary Examiner* — Michael Mooney
(74) *Attorney, Agent, or Firm* — Additon, Higgins & Pendleton, P.A.

(57) ABSTRACT

The flexible optical-fiber ribbon can be reversibly adapted to both planar and non-planar shapes (e.g., packed via folding or rolling) without damaging the optical-fiber ribbon or its constituent optical fibers.

20 Claims, 5 Drawing Sheets

(56) References Cited

FOREIGN PATENT DOCUMENTS

| JP | 09-218328 A | 8/1997 |
| JP | 2010-44336 A | 8/2010 |
| JP | 2011-221320 A | 11/2011 |
| JP | 2012-103341 A | 5/2012 |
| WO | 98/45344 A1 | 10/1998 |
| WO | 2009/062131 A1 | 5/2009 |
| WO | 2012/023508 A1 | 2/2012 |
| WO | 2012/165371 A1 | 12/2012 |

OTHER PUBLICATIONS

Henkel, Technical Data Sheet for Loctite AA 3108, www.henkel.com/industrial, Dec. 2014, pp. 1-3.
Henkel, Technical Data Sheet for Loctite SI 5240, www.henkel.com/industrial, Jan. 2015, pp. 1-4.
Momentive, Technical Data Sheet for RTV615, HCD-10333, www.momentive.com, Feb. 25, 2016, pp. 1-6.
Prysmian Group, "Another World's First for Prysmian's Flextube", www.prysmiangroup.com/en/corporate/press-release/Another-Worlds-First-for-Prysmian, Apr. 12, 2016, pp. 1-2.
AFL, Technical Data Sheet for Spider Web Ribbon, www.AFLglobal.com, Bro-04009, Sep. 8, 2014, pp. 1-2.
Meththananda, et al., "The relationship between Shore hardness of elastomeric dental materials and Young's modulus" Dental Materials, vol. 25, Issue 8, (Aug. 2009) Abstract only, downloaded at http://www.demajournal.com/article/S0109-5641(09)00123-7/ppt pp. 1.

\* cited by examiner

FLEXIBLE OPTICAL-FIBER RIBBON

CROSS-REFERENCE TO PRIORITY APPLICATION

This application hereby claims the benefit of pending International Application No. PCT/US2016/044182 (filed Jul. 27, 2016, at the U.S. Patent and Trademark Office) via 35 U.S.C. § 365(a). International Application No. PCT/US2016/044182 is hereby incorporated by reference in its entirety.

FIELD OF THE INVENTION

The present invention relates to optical-fiber ribbons.

BACKGROUND

Optical fibers provide advantages over conventional communication lines. As compared with traditional wire-based networks, optical-fiber communication networks can transmit significantly more information at significantly higher speeds. Optical fibers, therefore, are being increasingly employed in communication networks. U.S. Pat. No. 5,682,454, which is hereby incorporated by reference in its entirety, discloses an exemplary optical-fiber cable.

Optical fibers can be bonded together to form a planar, optical-fiber ribbon, which itself may be divisible into subunits (e.g., a twelve-fiber ribbon that is splittable into six-fiber subunits). Multiple optical-fiber ribbons may be aggregated to form a ribbon stack, which can have various sizes and shapes, such as a rectangular ribbon stack or a trapezoidal ribbon stack in which the uppermost and/or lowermost optical-fiber ribbons have fewer optical fibers than those toward the center of the stack. The ribbon-stack configuration helps to increase the density of optical elements (e.g., ribbonized optical fibers) within a round buffer tube and/or a round optical-fiber cable. Even so, the placement of planar, optical-fiber ribbons as rectangular or trapezoidal ribbon stacks within round tubes is spatially inefficient.

Mass-fusion splicing of optical-fiber ribbons requires a planar ribbon geometry, however, rendering non-planar, optical-fiber ribbons unsuitable for mass-fusion ribbon splicing operations.

SUMMARY

Accordingly, in one aspect, the present invention embraces a flexible optical-fiber ribbon that can be adapted to both planar and non-planar shapes (e.g., packed via folding or rolling) without damaging the optical-fiber ribbon or its constituent optical fibers.

The optical-fiber ribbon may be manufactured as a substantially planar optical-fiber ribbon that can be reversibly folded or rolled into a compact configuration to facilitate efficient packing within an optical-fiber cable. In a planar configuration, the optical-fiber ribbon is suitable for mass-fusion spicing.

In an exemplary embodiment, the flexible optical-fiber ribbon includes a plurality of optical fibers bonded in a side-by-side arrangement via a predominantly one-sided application of ribbon-matrix material. The substantially cured ribbon-matrix material has elongation-to-break and modulus characteristics that promote reversible folding and rolling of the optical-fiber ribbon.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces a flexible optical-fiber ribbon that can be folded or rolled into a compact shape and then unfolded or unrolled to a planar arrangement of parallel optical fibers without breaking the ribbon structure or damaging the constituent optical fibers. In a substantially planar geometry, the flexible optical-fiber ribbon facilitates mass-fusion spicing. In a substantially non-planar geometry, the flexible optical-fiber ribbon facilitates increased spatial efficiency within a fiber optic cabling structure, such as a micromodule or a buffer tube.

As depicted in FIGS. 1-4, exemplary, flexible optical-fiber ribbons 10 each include a plurality of optical fibers 11 arranged side-by-side such that the optical fibers 11 are substantially parallel to one another. Each optical fiber 11, which includes a component glass fiber 12 and one or more surrounding coating layers 13, may be closely spaced or contiguous with an adjacent optical fiber 11 but typically should not cross over one another along the length of the optical-fiber ribbon 10. The optical fibers 11 may be sandwiched, encapsulated, edge bonded, joined, or otherwise aggregated by a substantially cured ribbon-matrix material 14. The resulting optical-fiber ribbon has a substantially planar (i.e., flattened) geometry that defines a relatively narrow height, a relatively wide width, and a substantially continuous length (e.g., over 1,000 meters, such as 5,000 meters or more).

As used herein, an optical-fiber ribbon 10 as depicted in FIGS. 1-4 inherently defines an upper side (i.e., the top), a lower side (i.e., the bottom), a left edge, and a right edge. The respective upper and lower sides define the major surfaces of the optical-fiber ribbon. Those having ordinary skill in the art will appreciate that flipping the optical-fiber ribbon 180 degrees over its major transverse axis will reverse the top and bottom, and so the terms can be used interchangeably herein depending on the frame of reference. Similarly, those having ordinary skill in the art will appreciate that yaw rotating the optical-fiber ribbon 180 degrees will reverse the right edge and left edge, and so the terms can be used interchangeably herein depending on the frame of reference. Accordingly, as used herein the terms "first side" and "second, opposite side" refer to the respective upper and lower sides of the optical-fiber ribbon, or vice versa depending on the frame of reference.

As used herein, the term "cured" refers to a ribbon-matrix material that has achieved at least 90 percent of its maximum attainable modulus (e.g., Young's modulus). In exemplary embodiments of the flexible optical-fiber ribbon, the cured ribbon-matrix material is at least 95 percent cured (i.e., the ribbon-matrix material has achieved at least 95 percent of its maximum attainable Young's modulus).

An exemplary, flexible optical-fiber ribbon may be manufactured using a die to selectively apply a ribbon-matrix material to one or both major surfaces of a side-by-side array of optical fibers. Thereafter, the ribbon-matrix material is cured upon the optical fibers, typically via UV-curing lamp(s) to initiate curing, to form the optical-fiber ribbon. Curing of the ribbon-matrix material may be enhanced using in-line thermal ovens, too.

Figure 1:
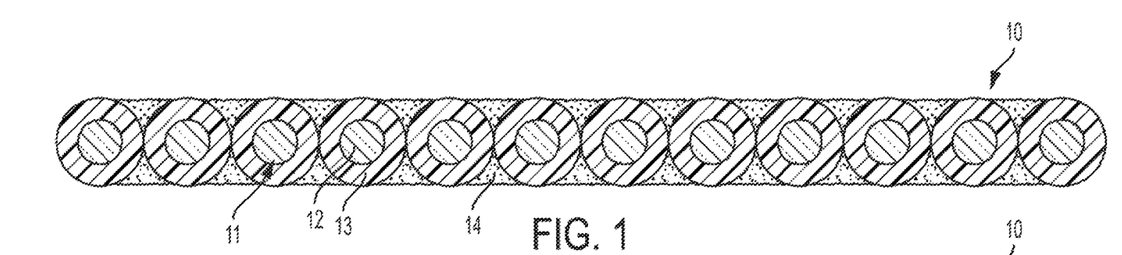
FIG. 1 depicts a cross-sectional perspective of an exemplary two-side, edge-bonded optical-fiber ribbon.

In one exemplary embodiment depicted in FIG. 1, the optical-fiber ribbon 10 includes optical fibers 11 dual-edge bonded with a cured ribbon-matrix material 14 (i.e., a two-side, edge-bonded optical-fiber ribbon). Ribbon-matrix material 14 is applied (i) to the first side of the parallel optical fibers 11 (i.e., the upper side as depicted in FIG. 1) to fully fill the curved, triangular regions defined by adjacent optical fibers 11 and (ii) to the second, opposite side of the parallel optical fibers 11 (i.e., the lower side as depicted in FIG. 1) to fully fill the curved, triangular regions defined by adjacent optical fibers 11.

In another exemplary embodiment, the optical-fiber ribbon includes optical fibers one-side, edge bonded with a cured ribbon-matrix material (i.e., at least 90-percent cured). In this regard, "one-side edge bonding" refers to an optical-fiber-ribbon geometry in which the ribbon-matrix material is surficially applied to one side of the arrangement of parallel optical fibers (e.g., via a predominantly one-sided application of ribbon-matrix material to the parallel optical fibers). Those having ordinary skill in the art will appreciate that some leakage can occur when applying the ribbon-matrix material to one side of the side-by-side arrangement of parallel optical fibers.

Typically, the cured ribbon-matrix material edge bonds the plurality of optical fibers in a side-by-side arrangement such that at least 70 percent (e.g., 75 percent or more) of the cured ribbon-matrix material is present on one side of the optical-fiber ribbon (i.e., either on the optical-fiber ribbon's upper side or lower side). In some embodiments of the optical-fiber ribbon, the cured ribbon-matrix material edge bonds the plurality of optical fibers in a side-by-side arrangement such that at least 80 percent (e.g., 90 percent or more) of the cured ribbon-matrix material is positioned on one side of the optical-fiber ribbon (i.e., either on the optical-fiber ribbon's upper side or lower side).

Figure 2:
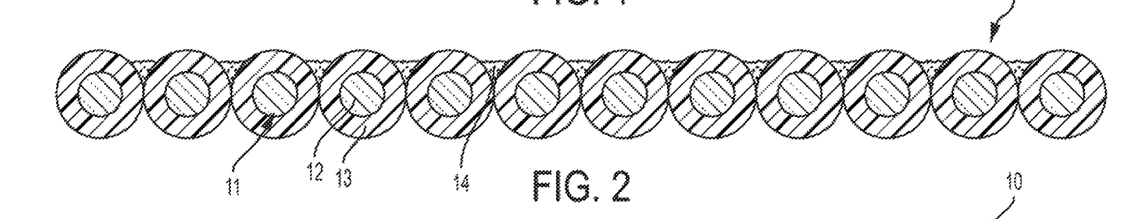
FIGS. 2 and 3 depict cross-sectional perspectives of exemplary one-side, edge-bonded optical-fiber ribbons having predominantly one-side edge bonding.
Figure 3:
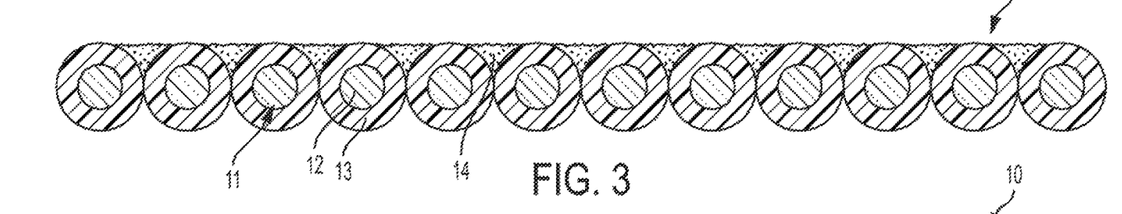

As depicted in FIGS. 2 and 3, respectively, the ribbon-matrix material 14 may be applied to only one side of the parallel optical fibers 11 to partly fill (FIG. 2) or to fully fill (FIG. 3) the curved, triangular regions defined by adjacent optical fibers 11. In this way, the cured ribbon-matrix material 14 one-side, edge bonds the parallel optical fibers 11 in a side-by-side arrangement. Those having ordinary skill in the art will appreciate that, even with the selective application of ribbon-matrix material 14 predominantly to only one side of the optical-fiber ribbon 10 (i.e., either the top or bottom of the optical-fiber ribbon 10), some ribbon-matrix material 14 may migrate between adjacent optical fibers 11 or ooze around the outmost optical fibers 11 such that some cured ribbon-matrix material 14 is present on both sides of the optical-fiber ribbon 10 (e.g., 85 percent on the upper side and 15 percent on the lower side, or vice versa depending on the frame of reference).

Figure 4:
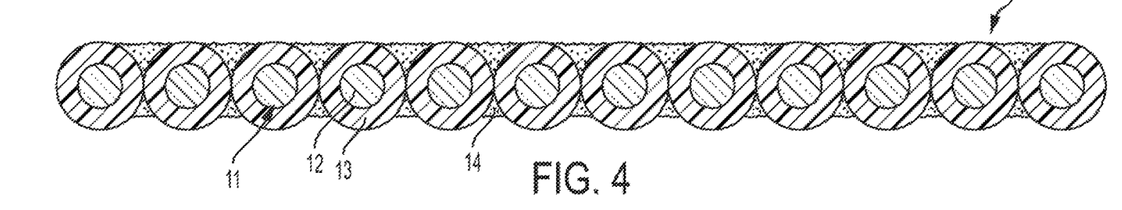
FIG. 4 depicts a cross-sectional perspective of another exemplary two-side, edge-bonded optical-fiber ribbon.

In another exemplary embodiment depicted in FIG. 4, the optical-fiber ribbon 10 includes optical fibers 11 dual-edge bonded with a cured ribbon-matrix material 14. Ribbon-matrix material 14 is applied (i) to the first side of the parallel optical fibers 11 (i.e., the upper side as depicted in FIG. 4) to fully fill the curved, triangular regions defined by adjacent optical fibers 11 and (ii) to the second, opposite side of the parallel optical fibers 11 (i.e., the lower side as depicted in FIG. 4) to partially fill the curved, triangular regions defined by adjacent optical fibers 11. Optionally, ribbon-matrix material can be applied to the first and second sides of the parallel optical fibers to partly fill the curved, triangular regions on both the optical-fiber ribbon's upper side and lower side.

The substantially cured ribbon-matrix material has elongation-to-break and modulus characteristics that promote reversible folding and/or rolling of the optical-fiber ribbon. As used herein, the properties for the ribbon-matrix material are reported at standard temperature and pressure (STP), namely room temperature (i.e., 20° C.) and atmospheric pressure (i.e., 760 torr).

In exemplary embodiments, the cured ribbon-matrix material has elongation-to-break (i.e., fracture strain) of at least 200 percent at 20° C., such as at least 300 percent at 20° C. (e.g., 350 percent or more). Typically, the cured ribbon-matrix material has elongation-to-break of at least 400 percent at 20° C., such as at least 500 percent at 20° C. (e.g., 600 percent or more). In some embodiments of the optical-fiber ribbon, the cured ribbon-matrix material has elongation-to-break of at least 700 percent at 20° C., such as between about 800 percent and 1,500 percent (e.g., between about 1,000 percent and 1,200 percent). If elongation-to-break is too low, the ribbon-matrix material will crack and separate when the optical-fiber ribbon is folded or rolled (e.g., if the ribbon-matrix material is not cured before folding or rolling). Elongation-to-break (i.e., fracture strain) for ribbon-matrix materials can be determined via either ISO 527-3:1995 (Determination of Tensile Properties) or ASTM D882-12 (Standard Test Method for Tensile Properties of Thin Plastic Sheeting), each of which is hereby incorporated by reference in its entirety.

The cured ribbon-matrix material typically has low Young's modulus over a broad temperature range. In exemplary embodiments, the cured ribbon-matrix material has Young's modulus of between about 0.5 and 20 MPa at 20° C. (e.g., 1-20 MPa), such as between 1 and 15 MPa at 20° C. inclusively. Typically, the cured ribbon-matrix material has Young's modulus of between 1.5 and 10 MPa at 20° C. inclusively, such as between 2 and 5 MPa at 20° C. inclusively. In some embodiments of the optical-fiber ribbon, the cured ribbon-matrix material has Young's modulus of less than 3 MPa at 20° C. Modulus (e.g., Young's modulus) for ribbon-matrix materials can be determined via either ISO 527-3:1995 (Determination of Tensile Properties) or ASTM D882-12 (Standard Test Method for Tensile Properties of Thin Plastic Sheeting).

Moreover, the cured ribbon-matrix material typically maintains low Young's modulus even at low temperatures. In exemplary embodiments, the cured ribbon-matrix material has Young's modulus of 100 MPa or less at −40° C., such as 75 MPa or less at −40° C. (e.g., 60 MPa or less at −40° C.). Typically, the cured ribbon-matrix material has Young's modulus of 50 MPa or less at −40° C., such as 25

MPa or less at −40° C. In some embodiments of the optical-fiber ribbon, the cured ribbon-matrix material has Young's modulus of less than 15 MPa at −40° C. (e.g., between 1 and 10 at −40° C.). In notable, exemplary embodiments of the optical-fiber ribbon, the cured ribbon-matrix material maintains Young's modulus of between 1 and 20 MPa over the temperature range of −40° C. and 20° C. Low-temperature Young's modulus can be determined via dynamic mechanical analysis (DMA), also referred to as dynamic mechanical thermal analysis (DMTA), such as by using a TA 2980 Dynamic Mechanical Analyzer.

By way of contrast, folding or rolling a conventional optical-fiber ribbon having a high-modulus ribbon-matrix material tends to impart high, localized stresses to the constituent optical fibers, especially at low temperatures (between 0° C. and −50° C.). Such extreme ribbon deformation can cause not only increased optical-fiber attenuation but also interface delamination, such as between the optical fiber's glass and surrounding primary coating or between the optical fiber's outer coating (e.g., a secondary coating or tertiary ink layer) and the surrounding ribbon-matrix material. On the other hand, if the modulus of the ribbon-matrix material is too low, the folding and rolling of the optical-fiber ribbon tends to be irreversible (e.g., the optical-fiber ribbon resists returning from a compact configuration to a planar configuration as is necessary to facilitate mass-fusion splicing operations).

In other exemplary embodiments of the optical-fiber ribbon, the cured ribbon-matrix material has Shore A hardness between 40 and 75, such as Shore A hardness between 50 and 70. Hardness (e.g., Shore A hardness) for ribbon-matrix materials can be determined via ISO 868:2003 (Determination of indentation hardness by means of a durometer (Shore hardness)), which is hereby incorporated by reference in its entirety.

Suitable compositions for the ribbon-matrix material include low-modulus elastomers and silicones, such as UV-curable silicones and RTV silicones (i.e., room-temperature-vulcanization silicone). The UV-cured silicones have some advantages over RTV silicones, including faster curing and reduced shrinkage. In addition, unlike UV-cured silicones, RTV silicones require exposure to humidity and high temperatures for extended time periods and can generate unwanted byproducts (e.g., acetic acid) during curing. Suitable UV-curable silicones include LOCTITE® SI 5240™ UV-cured silicone and Addisil UV-cured silicones (e.g., UV 50 EX, UV 60 EX, and UV 70 EX). As will be appreciated by those having ordinary skill in the art, UV curing can be enhanced by modifying UV-lamp configurations, introducing more photoinitiator, introducing a different photoinitiator, making slight chemical modifications (e.g., hybrid silicone/acrylate systems), and/or employing supplemental thermal curing. For silicone acrylates, an exemplary photoinitiator is 2-hydroxy-2-methyl-1-phenylpropane-1-one (HMPP) (e.g., Ciba Additives' DAROCUR® 1173). Other photoinitiators with similar photodecomposition mechanisms are TEGO® PC 750 or TEGO® A16.

Figure 5:
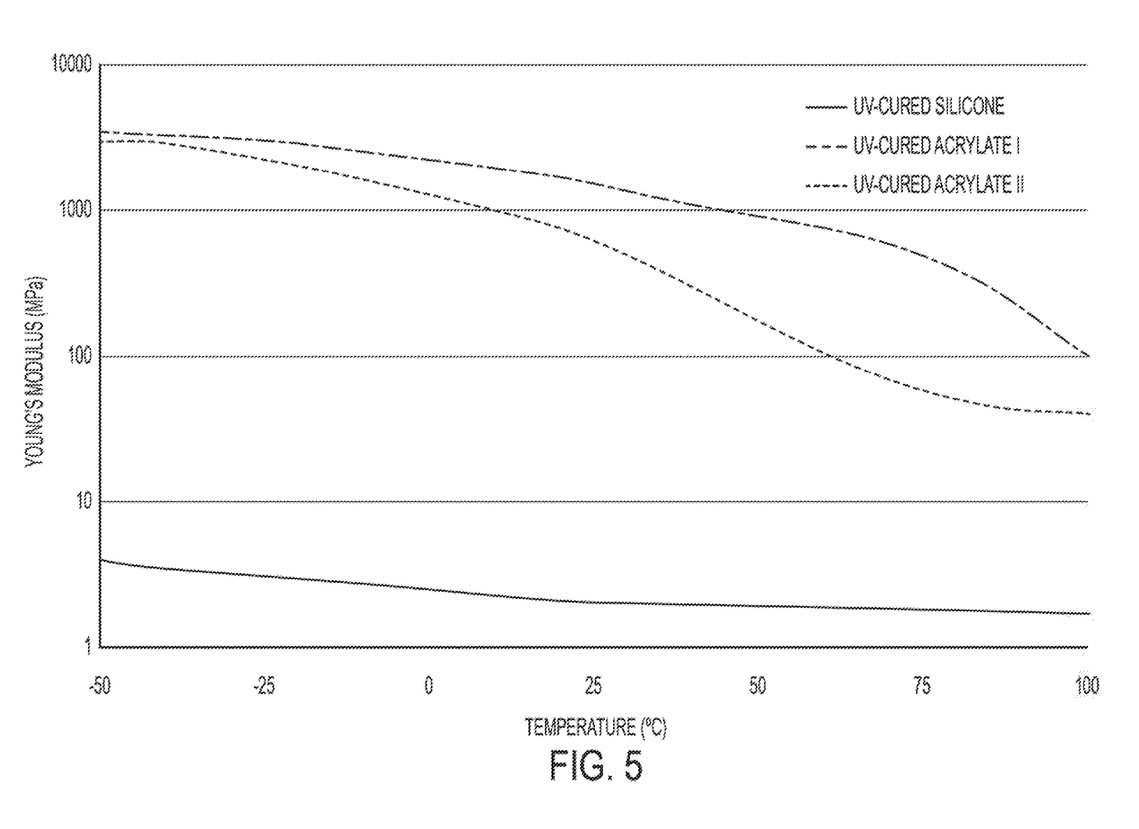
FIG. 5 depicts Young's modulus as a function of temperature for various ribbon-matrix materials.

FIG. 5 depicts Young's modulus as a function of temperature for various ribbon-matrix materials, including a suitable UV-curable silicone (i.e., LOCTITE® SI 5240™ UV-cured silicone) and conventional UV-curable acrylates (i.e., DSM 9D9-464 and DSM 9D9-518, respectively). Modulus was measured via dynamic material analysis (DMA).

The flexible optical-fiber ribbon may be manufactured as a planar optical-fiber ribbon. In its substantially planar geometry, the optical-fiber ribbon is suitable for mass-fusion spicing. Unlike conventional optical-fiber ribbons, which will become damaged if forcibly folded or rolled, the present flexible optical-fiber ribbon is capable of being reversibly folded or reversibly rolled into a compact configuration without sustaining damage. In its substantially non-planar, compact geometry, the optical-fiber ribbon may be more efficiently packed (e.g., folded or rolled) within optical-fiber cablings, such as a tearable micromodule or a buffer tube. In exemplary cabling embodiments, one, two, three, or four flexible optical-fiber ribbons (e.g., twelve-optical-fiber ribbons) may be positioned within a micromodule, such as Prysmian's FLEXTUBE® micromodule.

Figure 6:
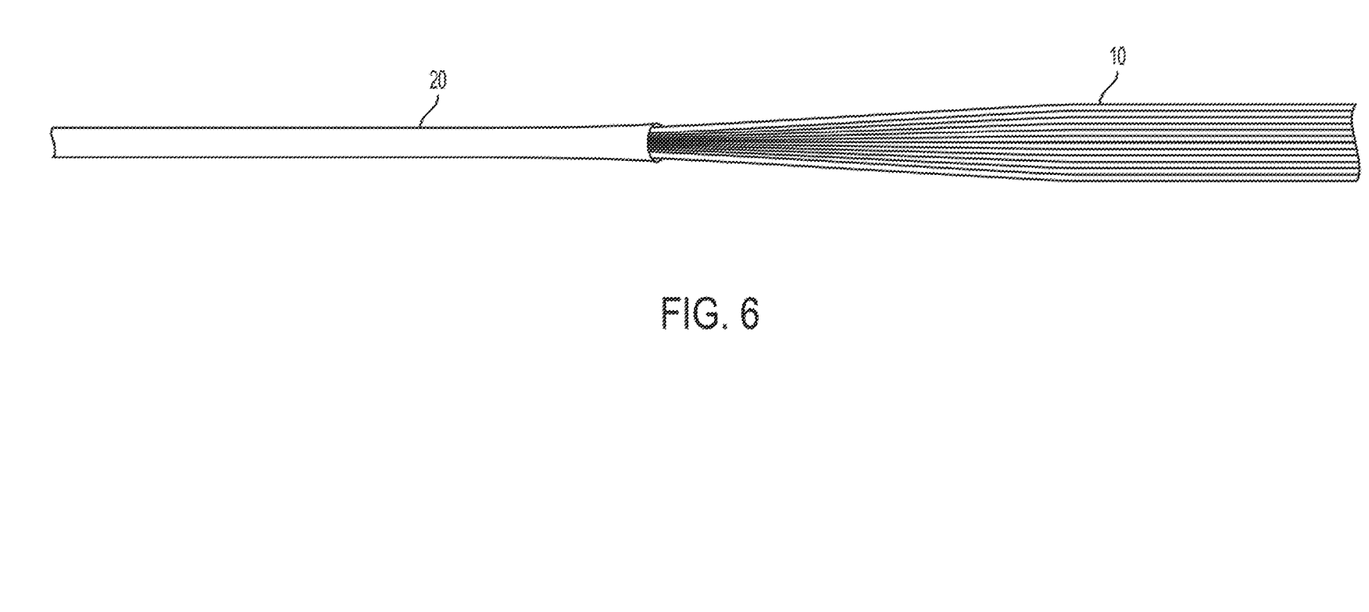
FIG. 6 depicts an exemplary one-side, edge-bonded ribbon efficiently packed within a micromodule.

FIG. 6 depicts a flexible, one-side, edge-bonded twelve-optical-fiber ribbon 10 efficiently packed within a tearable FLEXTUBE® micromodule 20 having an approximately 1.2-millimeter inner diameter. Those having ordinary skill in the art will appreciate that the flexible optical-fiber ribbon reverts to its planar geometry when unpacked from the micromodule, thereby facilitating mass-fusion spicing.

In its planar geometry, the optical-fiber ribbon defines a maximum ribbon cross-sectional width ($W_{max}$) (e.g., a major transverse axis). The optical-fiber ribbon is sufficiently flexible and durable to withstand—without damaging the structure of the optical-fiber ribbon, including its constituent optical fibers—repeated transverse folding or rolling from its maximum ribbon cross-sectional width ($W_{max}$) to a significantly reduced ribbon cross-sectional width ($W_f$) (i.e., $W_{max} \gg W_f$). In this regard, damage to the optical-fiber ribbon would include cracks or splits to the cured ribbon-matrix material, as well as delamination at the interface of the optical fibers and the cured ribbon-matrix material.

Figure 7:
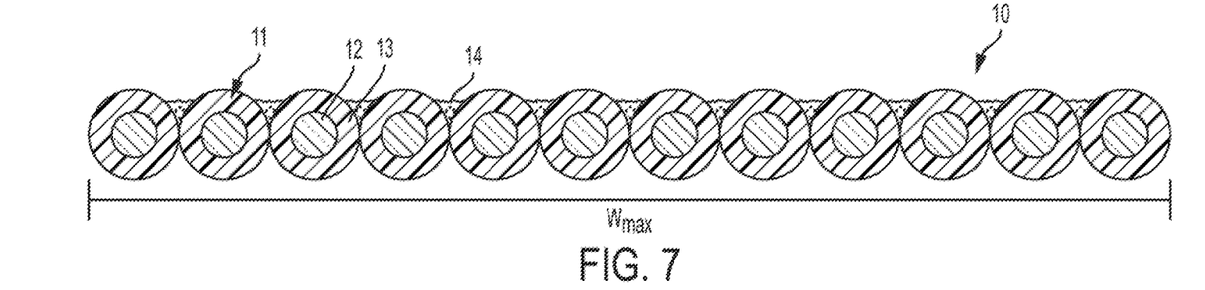
FIGS. 7 and 8 depict cross-sectional perspectives of an exemplary one-side, edge-bonded optical-fiber ribbon having predominantly one-side edge bonding in a planar configuration and a folded configuration, respectively.
Figure 8:
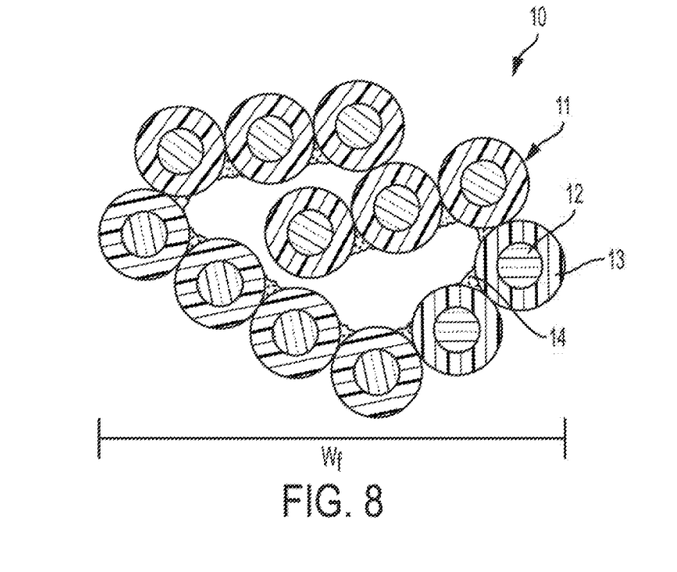

As noted, the ribbon-matrix material may be applied to only one side of the parallel optical fibers to partially fill the curved, triangular regions defined by adjacent optical fibers to achieve an exemplary one-side, edge-bonded optical-fiber ribbon. FIG. 7 depicts such an exemplary one-side, edge-bonded optical-fiber ribbon in a planar ribbon configuration. FIG. 8 depicts the same exemplary one-side, edge-bonded optical-fiber ribbon in a compact ribbon configuration after transverse folding about the length of the optical-fiber ribbon.

In one exemplary embodiment, the optical-fiber ribbon is reversibly, transversely foldable (or reversibly, transversely rollable) from a planar ribbon configuration defining a maximum ribbon cross-sectional width ($W_{max}$) to a non-planar ribbon configuration defining a reduced ribbon cross-sectional width ($W_f$) that is 75 percent or less (e.g., 60 percent or less) of the maximum ribbon cross-sectional width ($W_{max}$) without damaging the structure of the optical-fiber ribbon. Moreover, the optical-fiber ribbon can withstand such reversible packing for at least three cycles (e.g., five cycles or more), typically for at least ten cycles (e.g., 20 cycles or more).

In another exemplary embodiment, the optical-fiber ribbon is reversibly, transversely foldable (or reversibly, transversely rollable) from a planar ribbon configuration defining a maximum ribbon cross-sectional width ($W_{max}$) to a non-planar ribbon configuration defining a reduced ribbon cross-sectional width ($W_f$) that is 50 percent or less (e.g., 40 percent or less) of the maximum ribbon cross-sectional width ($W_{max}$) without damaging the structure of the optical-fiber ribbon. Moreover, the optical-fiber ribbon can withstand such reversible packing for at least three cycles (e.g., five cycles or more), typically for at least ten cycles (e.g., 20 cycles or more).

In yet another exemplary embodiment, the optical-fiber ribbon is reversibly, transversely foldable (or reversibly, transversely rollable) from a planar ribbon configuration defining a maximum ribbon cross-sectional width ($W_{max}$) to a non-planar ribbon configuration defining a reduced ribbon cross-sectional width ($W_f$) that is 35 percent or less (e.g., 25 percent or less) of the maximum ribbon cross-sectional width ($W_{max}$) without damaging the structure of the optical-fiber ribbon. Moreover, the optical-fiber ribbon can withstand such reversible packing for at least three cycles (e.g., five cycles or more), typically for at least ten cycles (e.g., 20 cycles or more).

Those having ordinary skill in the art will recognize compacting larger-count optical-fiber ribbons (e.g., twelve-optical-fiber ribbons, 24-optical-fiber ribbons, or 36-optical-fiber ribbons), such as depicted in FIG. 8, is typically more efficient than compacting smaller-count optical-fiber ribbons (e.g., four-optical-fiber ribbons or six-optical-fiber ribbons).

Alternatively, similar flexibility and durability can be calculated using as the starting measurement a transverse major axis that is defined by the opposite, outermost optical fibers within the optical-fiber ribbon (e.g., the distance between the first and twelfth optical fibers in a 12-fiber ribbon).

The present flexible optical-fiber ribbon may be manufactured to comply with the generic requirements set forth in Telcordia Technologies GR-20-CORE (Issue 4, July 2013), namely Section 5 ("Requirements for Optical Fiber Ribbons"), which itself references Publication No. ANSI/ICEA S-87-640-2011 for "Standard for Optical Fiber Outside Plant Communication Cable," (Fifth Edition—2011), such as section 7.14 ("Ribbon Dimensions"). GR-20-CORE (Issue 4, July 2013) and Publication No. ANSI/ICEA S-87-640-2011 (Fifth Edition, 2011), each of which is hereby incorporated by reference in its entirety, provide the following maximum dimensions for optical-fiber ribbons:

TABLE 1

(Maximum Ribbon Dimensions)

| optical fibers (n) | ribbon width (w) (μm) | ribbon height (h) (μm) | optical-fiber alignment extreme fibers (b) (μm) | optical-fiber alignment planarity (p) (μm) |
| --- | --- | --- | --- | --- |
| 2 | 720 | 360 | 270 | — |
| 4 | 1220 | 360 | 786 | 50 |
| 6 | 1648 | 360 | 1310 | 50 |
| 8 | 2172 | 360 | 1834 | 50 |
| 12 | 3220 | 360 | 2882 | 75 |
| 24 | 6500 | 360 | per 12-fiber unit | per 12-fiber unit |
| 36 | 9800 | 360 | per 12-fiber unit | per 12-fiber unit |

Figure 9:
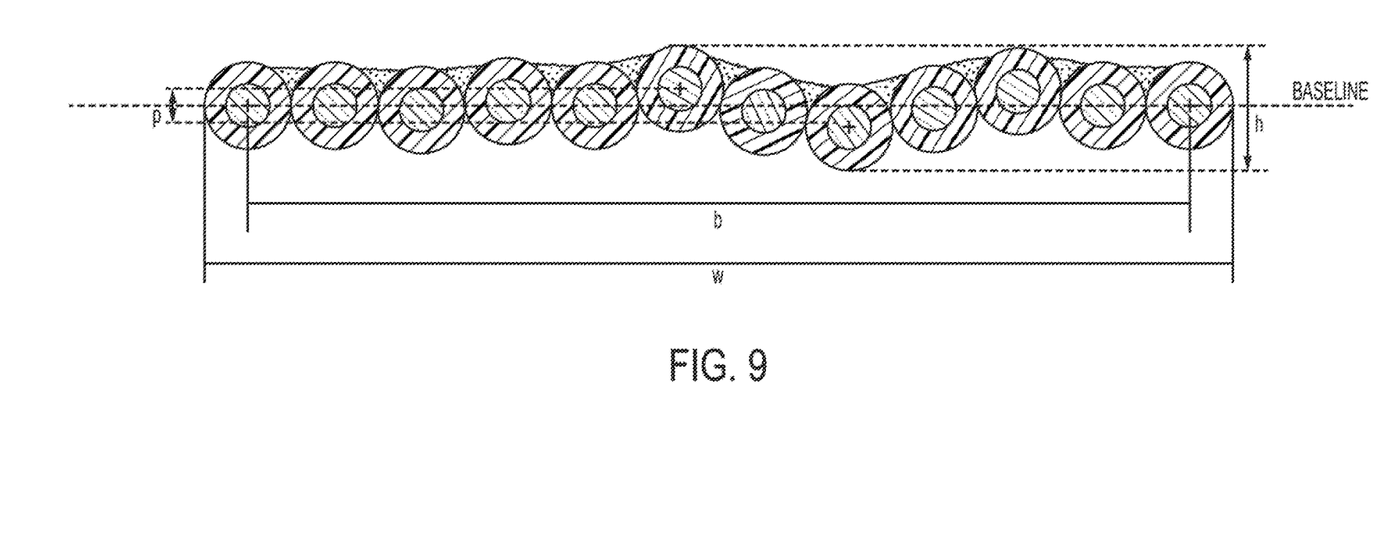
FIG. 9 depicts dimensional parameters for exemplary optical-fiber ribbons.

Accordingly, in an exemplary embodiment, the optical-fiber ribbon conforms to the ribbon-dimension requirements provided in Table 1 (above) as disclosed in both GR-20-CORE (Issue 4, July 2013) and Publication No. ANSI/ICEA S-87-640-2011 (Fifth Edition, 2011). FIG. 9 depicts the dimensional parameters presented in Table 1.

Alternatively, optical-fiber planarity within an optical-fiber ribbon may be expressed as a function of optical-fiber width (i.e., optical-fiber diameter). For example, optical-fiber planarity can be defined as the normal distance between the extreme upper and lower optical fibers within the optical-fiber ribbon relative to a transverse baseline defined by the opposite, outermost optical fibers within the optical-fiber ribbon (e.g., a baseline connecting either the respective centers of the two outermost optical fibers or the corresponding glass cladding edges of the two outermost optical fibers). See FIG. 9. After establishing an appropriate transverse baseline and identifying the uppermost and lowermost optical fibers in the optical-fiber ribbon, optical-fiber planarity can be determined as the sum of the perpendicular distance from the defined transverse baseline (i) to the respective centers of the glass cores of the uppermost and lowermost optical fibers or (ii) to the corresponding glass cladding edges of the uppermost and lowermost optical fibers. Those having ordinary skill in the art will appreciate that, in determining optical-fiber planarity using glass cladding edges, the same corresponding position (e.g., six o'clock) must be selected for the opposite, outermost optical fibers within the optical-fiber ribbon (i.e., in establishing the baseline) and for the respective glass cladding edges of the uppermost and lowermost optical fibers (i.e., in determining normal distance to the baseline).

In exemplary embodiments of the optical-fiber ribbon, the normal distance between the extreme upper and lower optical fibers is less than 40 percent of the mean width of the optical fibers (i.e., optical-fiber diameter) within the optical-fiber ribbon. In other exemplary embodiments of the optical-fiber ribbon, the normal distance between the extreme upper and lower optical fibers is less than 30 percent (e.g., less than 20 percent, such as 10 percent or less) of the mean width of the optical fibers within the optical-fiber ribbon. This normalized optical-fiber planarity should be measured from a transverse baseline defined by the opposite, outermost optical fibers within the optical-fiber ribbon, namely from the respective centers of the optical fibers' glass cores or from the respective, corresponding glass cladding edges of the optical fibers (e.g., the respective six-o'clock positions). This concept is discussed at Section 5 ("Requirements for Optical Fiber Ribbons") in Telcordia Technologies GR-20-CORE (Issue 4, July 2013).

Similarly, optical-fiber spacing within an optical-fiber ribbon may be expressed as a function of optical-fiber width (i.e., optical-fiber diameter), such as by mean separation between adjacent optical fibers (e.g., from the optical fibers' respective outermost coating layers) within the optical-fiber ribbon. In exemplary embodiments of the optical-fiber ribbon, the mean separation between adjacent optical fibers within the optical-fiber ribbon is less than 15 percent (e.g., less than 10 percent) of the mean width of the optical fibers (i.e., optical-fiber diameter) within the optical-fiber ribbon. In exemplary embodiments of the optical-fiber ribbon, the mean separation between adjacent optical fibers within the optical-fiber ribbon is less than 5 percent of the mean width of the optical fibers within the optical-fiber ribbon, such as where adjacent optical fibers are substantially contiguous to one another within the optical-fiber ribbon.

By way of contrast, some conventional optical-fiber ribbons achieve flexibility via intermittent bonding with a high-modulus ribbon-matrix material (e.g., 300 MPa), such as disclosed in U.S. Pat. No. 9,086,555, which is hereby incorporated by reference in its entirety. The optical fibers within such intermittently bonded optical-fiber ribbons, such as a "spider web ribbon," can freely move when not clamped or otherwise secured. Whether the optical fibers are clamped or not, intermittently bonded optical-fiber ribbons employ complex bonding patterns and typically fail to satisfy the spacing and planarity requirements disclosed in both GR-20-CORE (Issue 4, July 2013) and Publication No. ANSI/ICEA S-87-640-2011 (Fifth Edition, 2011). This renders conventional, intermittently bonded optical-fiber ribbons (e.g., "spider web ribbon") poor candidates for mass-fusion splicing.

It is desirable to increase the density of optical-fiber ribbons in buffer tubes or cables, subject to other constraints (e.g., cable or mid-span attenuation). In this regard, the optical fibers themselves may be designed for increased packing density. For example, the optical fiber may possess modified properties, such as improved refractive-index profile, core or cladding dimensions, or primary-coating thickness and/or modulus, to improve microbending and macrobending characteristics.

In one embodiment, the optical fibers employed in the present optical-fiber ribbons may be conventional standard single-mode fibers (SSMF). Suitable single-mode optical fibers (e.g., enhanced single-mode fibers (ESMF)) that are compliant with the ITU-T G.652.D recommendations are commercially available, for instance, from Prysmian Group (Claremont, N.C., USA). The ITU-T G.652 (November 2009) recommendations and each of its attributes (i.e., A, B, C, and D) are hereby incorporated by reference in their entirety.

In another embodiment, bend-insensitive single-mode optical fibers may be employed in the optical-fiber ribbons according to the present invention. Bend-insensitive optical fibers are less susceptible to attenuation (e.g., caused by microbending or macrobending). Exemplary single-mode glass fibers for use in the present optical-fiber ribbons are commercially available from Prysmian Group (Claremont, N.C., USA) under the trade name BendBright®, which is compliant with the ITU-T G.652.D recommendations. That said, it is within the scope of the present invention to employ a bend-insensitive glass fiber that meets the ITU-T G.657.A recommendations (e.g., the ITU-T G.657.A1 (November 2009) and the ITU-T G.657.A2 (November 2009) subcategories) and/or the ITU-T G.657.B recommendations (e.g., the ITU-T G.657.B2 (November 2009) and the ITU-T G.657.B3 (November 2009) subcategories). In this regard, the ITU-T G.657.A1 (November 2009) subcategory fully encompasses the former ITU-T G.657.A (December 2006) category, and the ITU-T G.657.B2 (November 2009) subcategory fully encompasses the former ITU-T G.657.B (December 2006) category. The ITU-T G.657.A/B recommendations are hereby incorporated by reference in their entirety.

In this regard, exemplary bend-insensitive single-mode glass fibers for use in the present invention are commercially available from Prysmian Group (Claremont, N.C., USA) under the trade names BendBrightXS® and BendBright-Elite™. BendBrightXS® optical fibers and BendBright-Elite™ optical fibers are not only compliant with both the ITU-T G.652.D and ITU-T G.657.A/B recommendations, but also demonstrate significant improvement with respect to both macrobending and microbending. As compared with such bend-insensitive single-mode optical fibers, conventional single-mode optical fibers typically do not comply with either the ITU-T G.657.A recommendations or the ITU-T G.657.B recommendations, but do typically comply with the ITU-T G.652 recommendations (e.g., the ITU-T G.652.D recommendations).

As set forth in commonly assigned U.S. Pat. No. 8,265,442, U.S. Pat. No. 8,145,027, U.S. Pat. No. 8,385,705, and International Patent Application Publication No. WO 2009/062131 A1, pairing a bend-insensitive glass fiber (e.g., Prysmian Group's single-mode glass fibers available under the trade name BendBrightXS®) and a primary coating having very low modulus achieves optical fibers having exceptionally low losses (e.g., reductions in microbend sensitivity of at least 10x as compared with a single-mode optical fiber employing a conventional coating system). The optical-fiber ribbons according to the present invention may employ the optical-fiber coatings disclosed in U.S. Pat. No. 8,265,442, U.S. Pat. No. 8,145,027, U.S. Pat. No. 8,385,705, and International Patent Application Publication No. WO 2009/062131 A1, which are hereby incorporated by reference in their entirety, with either single-mode optical fibers or multimode optical fibers.

In another embodiment, the optical fibers employed in the present optical-fiber ribbons are conventional multimode optical fibers having a 50-micron core (e.g., OM2 multimode optical fibers) and complying with the ITU-T G.651.1 recommendations. The ITU-T G.651.1 (July 2007) recommendations are hereby incorporated by reference in their entirety. Exemplary multimode optical fibers that may be employed include MaxCap™ multimode optical fibers (OM2+, OM3, or OM4), which are commercially available from Prysmian Group (Claremont, N.C., USA).

Alternatively, the present optical-fiber ribbons may include bend-insensitive multimode optical fibers, such as MaxCap™-BB-OMx multimode optical fibers, which are commercially available from Prysmian Group (Claremont, N.C., USA). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

In contrast, conventional multimode optical fibers, in accordance with the ITU-T G.651.1 recommendations, have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, conventional multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

Multimode optical fibers can be advantageous, because their relatively large core diameter facilitates easy connectorization. Accordingly, it is within the scope of the present invention to employ multimode optical fibers having enlarged core diameters (e.g., 62.5 microns or greater), such as between about 70 microns and 100 microns (e.g., about 80 microns). An exemplary multimode optical fiber having an enlarged core diameter is disclosed in commonly assigned U.S. Pat. No. 9,341,771 for a Bend-Resistant Multimode Optical Fiber, (Molin et al.), which is hereby incorporated by reference in its entirety. In particular, U.S. Pat. No. 9,341,771 discloses a trench-assisted multimode optical fiber having improved bend resistance.

The optical fibers typically have an outer diameter of between about 235 microns and 265 microns, although optical fibers having a smaller diameter may be employed in the present optical-fiber ribbons.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns), and the secondary coating may have an outer diameter of between about 235 microns and 265 microns (i.e., a secondary coating thickness of between about 20 microns and 45 microns). Optionally, the optical fiber may include an outermost ink layer, which is typically between two and ten microns.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber ribbon, comprising:
a plurality of optical fibers; and
a cured ribbon-matrix material edge bonding the plurality of optical fibers in a side-by-side arrangement such that at least 70 percent of the cured ribbon-matrix material is positioned on one side of the optical-fiber ribbon, the cured ribbon-matrix material having (i) elongation-to-break of at least 200 percent at 20° C., (ii) Young's modulus of 1-20 MPa at 20° C., and (iii) Young's modulus of 100 MPa or less at −40° C.;
wherein the mean separation between adjacent optical fibers within the optical-fiber ribbon is less than 15 percent of the mean width of the optical fibers within the optical-fiber ribbon; and
wherein, for at least five folding cycles, the optical-fiber ribbon is reversibly, transversely foldable from a planar ribbon configuration defining a maximum ribbon cross-sectional width ($W_{max}$) to a non-planar ribbon configuration defining a reduced ribbon cross-sectional width ($W_f$) that is 50 percent or less of the maximum ribbon cross-sectional width ($W_{max}$) without damaging the structure of the optical-fiber ribbon.

2. The optical-fiber ribbon according to claim 1, wherein the cured ribbon-matrix material has elongation-to-break of at least 300 percent at 20° C.

3. The optical-fiber ribbon according to claim 1, wherein the cured ribbon-matrix material has Young's modulus of 75 MPa or less at −40° C.

4. The optical-fiber ribbon according to claim 1, wherein the cured ribbon-matrix material bonds the plurality of optical fibers in a side-by-side arrangement via the application of ribbon-matrix material predominantly to only one side of the optical-fiber ribbon to at least partly fill the curved, triangular regions defined by adjacent optical fibers.

5. The optical-fiber ribbon according to claim 1, wherein the adjacent optical fibers are substantially contiguous to one another within the optical-fiber ribbon.

6. The optical-fiber ribbon according to claim 1, wherein the cured ribbon-matrix material comprises silicone.

7. The optical-fiber ribbon according to claim 1, wherein the cured ribbon-matrix bonding the plurality of optical fibers is at least 95 percent cured.

8. The optical-fiber ribbon according to claim 1, wherein the cured ribbon-matrix material has Shore A hardness of between 40 and 75.

9. An optical-fiber ribbon, comprising:
a plurality of optical fibers; and
a cured ribbon-matrix material edge bonding the plurality of optical fibers in a side-by-side arrangement, the cured ribbon-matrix material having (i) elongation-tobreak of at least 350 percent at 20° C., (ii) Young's modulus of 1-15 MPa at 20° C., and (iii) Young's modulus of 60 MPa or less at −40° C.;

wherein, for at least ten folding cycles, the optical-fiber ribbon is reversibly, transversely foldable from a planar ribbon configuration defining a maximum ribbon cross-sectional width ($W_{max}$) to a non-planar ribbon configuration defining a reduced ribbon cross-sectional width ($W_f$) that is 75 percent or less of the maximum ribbon cross-sectional width ($W_{max}$) without damaging the structure of the optical-fiber ribbon.

10. The optical-fiber ribbon according to claim 9, wherein the cured ribbon-matrix material edge bonds the plurality of optical fibers in a side-by-side arrangement such that at least 75 percent of the cured ribbon-matrix material is positioned on one side of the optical-fiber ribbon.

11. The optical-fiber ribbon according to claim 9, wherein the cured ribbon-matrix material bonds the plurality of optical fibers in a side-by-side arrangement via the application of ribbon-matrix material predominantly to only one side of the optical-fiber ribbon to at least partly fill the curved, triangular regions defined by adjacent optical fibers.

12. The optical-fiber ribbon according to claim 9, wherein the optical-fiber ribbon is reversibly, transversely foldable from a planar ribbon configuration defining a maximum ribbon cross-sectional width ($W_{max}$) to a non-planar ribbon configuration defining a reduced ribbon cross-sectional width ($W_f$) that is 60 percent or less of the maximum ribbon cross-sectional width ($W_{max}$) without damaging the structure of the optical-fiber ribbon.

13. The optical-fiber ribbon according to claim 9, wherein the optical-fiber ribbon is reversibly, transversely foldable from a planar ribbon configuration defining a maximum ribbon cross-sectional width ($W_{max}$) to a non-planar ribbon configuration defining a reduced ribbon cross-sectional width ($W_f$) that is 50 percent or less of the maximum ribbon cross-sectional width ($W_{max}$) without damaging the structure of the optical-fiber ribbon.

14. The optical-fiber ribbon according to claim 9, wherein the mean separation between adjacent optical fibers within the optical-fiber ribbon is less than 15 percent of the mean width of the optical fibers within the optical-fiber ribbon.

15. The optical-fiber ribbon according to claim 9, wherein the adjacent optical fibers are substantially contiguous to one another within the optical-fiber ribbon.

16. The optical-fiber ribbon according to claim 9, wherein the cured ribbon-matrix material comprises silicone.

17. The optical-fiber ribbon according to claim 9, wherein the cured ribbon-matrix bonding the plurality of optical fibers is at least 95 percent cured.

18. The optical-fiber ribbon according to claim 9, wherein the cured ribbon-matrix material has Shore A hardness of between 40 and 75.

19. The optical-fiber ribbon according to claim 9, wherein the cured ribbon-matrix material has elongation-to-break of between 800 and 1,500 percent at 20° C.

20. The optical-fiber ribbon according to claim 1, wherein the cured ribbon-matrix material has elongation-to-break of more than 500 percent at 20° C.

\* \* \* \* \*